Herbert H. Vickers
Alfred E. Dietz
Herbert P. Dengler
Edward W. S. Nicholson   Inventors
By *Alin B. Johnson*

Patent Attorney

Herbert H. Vickers
Alfred E. Dietz
Herbert P. Dengler
Edward W. S. Nicholson
Inventors By Alvin B. Johnson Patent Attorney

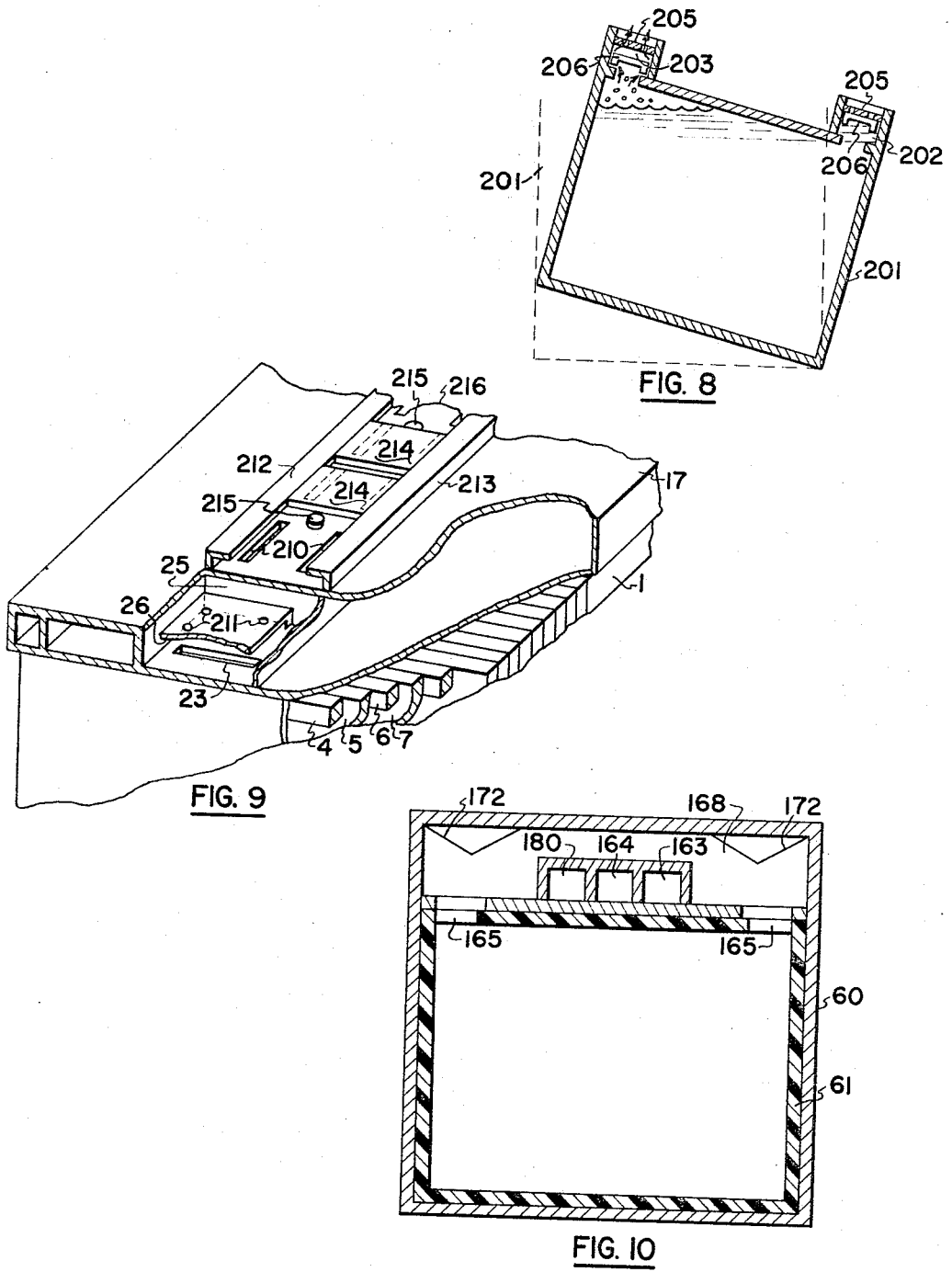

United States Patent Office 3,331,704
Patented July 18, 1967

3,331,704
FUEL CELL WITH FLUID CONTROL SYSTEM
Herbert H. Vickers, Union, Alfred E. Dietz, Clark, Herbert P. Dengler, Fair Haven, and Edward W. S. Nicholson, Summit, N.J., assignors to Esso Research and Engineering Company, a corporation of Delaware
Filed Aug. 30, 1961, Ser. No. 135,021
5 Claims. (Cl. 136—86)

The present invention relates to a fluid control system for fuel cells, and to means for improving the assembly and operation of a plurality of fuel cells in combinations hereinafter referred to as fuel cell packs. In particular, this invention relates to such packs and to means for uniform distribution of fuel, oxidizing agent and electrolyte to and from the respective receiving zones of the individual cells therein. Additionally, the invention relates to apparatus whereby electrolyte is prevented from spilling over into adjacent cells.

In the prior art extensive efforts have been made to commercialize the principle of the fuel cell which involves direct generation of electric power by electrochemical oxidation of a combustible fuel without primary conversion to thermal energy. Recently, more intense efforts have been made to improve the efficiency and performance of the fuel cell and these efforts have met with some success. Individual fuel cells, however, produce rather low voltages and in the practical production of power by such means it is desirable to combine a plurality of fuel cells into multiple units or fuel cell packs of sufficient power to serve practical uses.

It is thus desirable to provide means for assembling groups of fuel cells in a single container whereby appreciable quantities of power and/or current may be produced from a compact unit. It is further desirable to have means whereby fluids such as the fuel, oxidizing agent and electrolyte may be fed uniformly to their respective chambers in the fuel cells in the fuel cell pack.

Furthermore, it has been found that in fuel cell pack units employing an organic fuel there is a tendency for carbon dioxide to be formed rapidly in the electrolyte chamber and to remove electrolyte from the electrolyte chamber as it exists from this chamber. It is thus desirable to provide means to remove the entrained electrolyte from the carbon dioxide and to return the recovered electrolyte to the electrolyte chamber. In addition, since these cell packs may be employed on mobile units, such as ships and lands vehicles, it is necessary to provide means whereby electrolyte which may spill from the electrolyte chamber of an individual cell is prevented from contacting adjacent electrolyte chambers, so as to short circuit the fuel cell pack.

It is, therefore, an object of the instant invention to provide apparatus whereby a large number of fuel cells may be used in a single fuel cell pack. Furthermore, it is an object to provide means by which the individual fuel cells in the fuel cell pack may, from central sources, be fed the fuel, oxidizing agent and electrolyte necessary for their operation.

It is a further object of the instant invention to provide apparatus to prevent the escape of electrolyte from the fuel cell pack with the carbon dioxide which is formed in the electrolyte chamber.

Still a further object is to provide means to afford uniform filling and withdrawing of electrolyte from the various electrolyte chambers in the fuel cell pack.

An additional object of the instant invention is to provide means to prevent electrolyte from spilling over into adjacent electrolyte chambers with resultant short circuiting of the fuel cell pack.

Other objects of the instant invention will appear in a more detailed description of the instant invention given below.

Accordingly, reference is made to the accompanying drawings forming a part of this specification.

FIGURE 8 shows a modification for controling electrolyte in a cell subject to tilting.

FIGURE 9 shows a modified form of the valve structure of FIGURE 1.

FIGURE 10 shows a further modification of apparatus of FIGURES 5 and 6.

Figure 1:
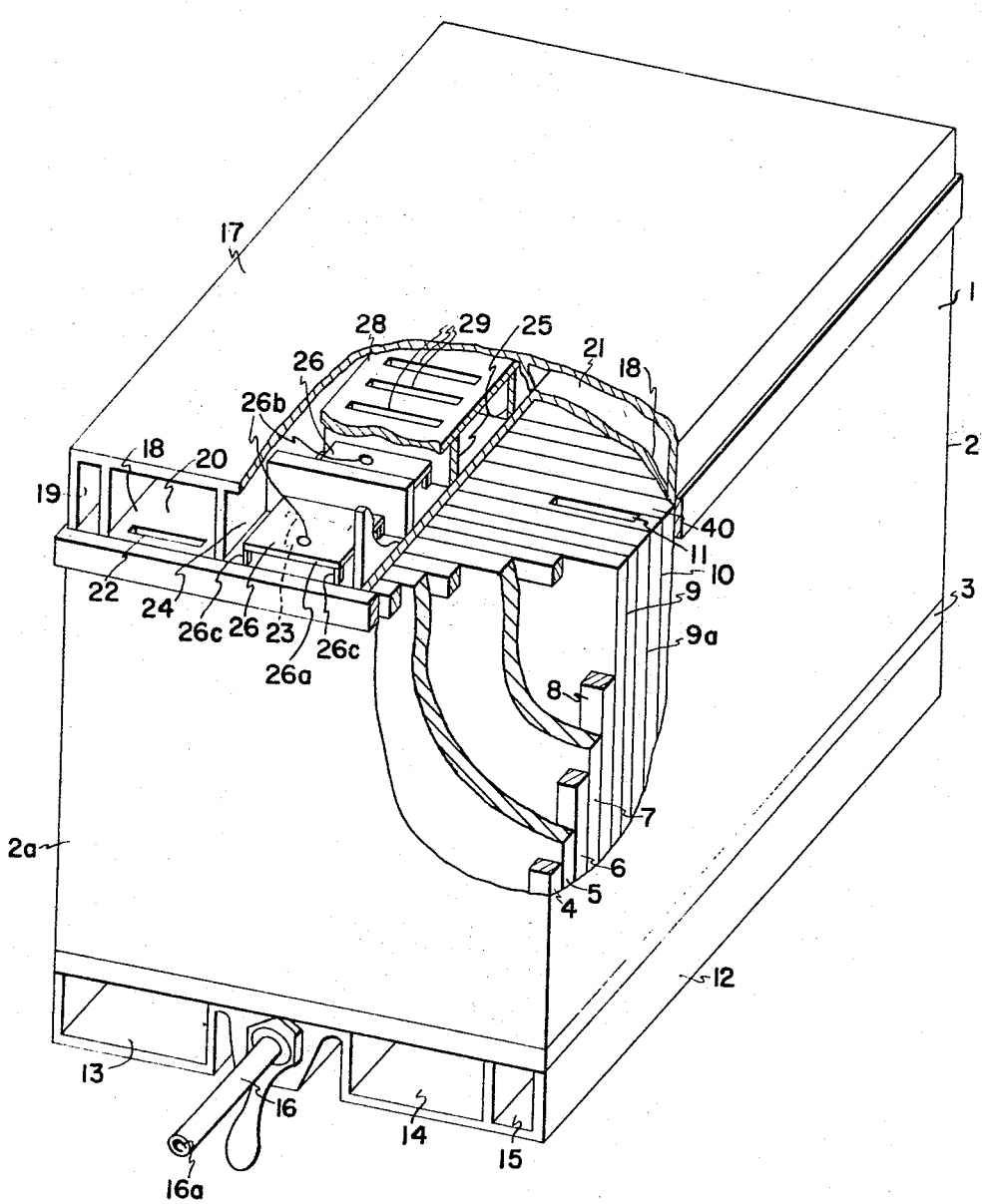
FIGURE 1 is a perspective view of a fuel cell pack with a portion cut away to show the fuel cell elements composing it. Shown also are some of the manifolds to remove the fuel and air from their respective chambers and the means by which entrained electrolyte may be removed from the carbon dioxide evolving from the electrolyte chamber.

Referring first to FIGURE 1, there is shown a fuel cell pack 1 comprising side walls 2, end walls 2a and a floor member or wall 3. The fuel cell pack 1 contains a multiplicity of fuel cell elements which are in side by side relationship and arranged to form a series of oxidant receiving zones or air feed chambers, liquid electrolyte chambers and fuel receiving zones of fueling chambers. As shown in FIGURE 1, a spacing element 4 is located adjacent the near-most end of the fuel cell pack 1, as seen in FIGURE 1. Adjacent to the member 4 is an electrode plate 5, which may be made of carbon or other suitable material, i.e. sufficiently porous to receive oxygen or air from the space provided by member 4. There follows another spacer element 6, similar to member 4, then fuel electrode plate 7 which may be generally similar to electrode 5 but may be made of different materials or contain a different catalyst. Thus between the end wall 2a of the fuel cell pack 1 and electrode 5, there is formed a chamber, in this instance an air feed chamber. Between electrode plates 5 and 7 there is formed another chamber which in this illustration is an electrolyte chamber.

Adjacent to electrode plate 7 there is another spacer 8 which separates fuel electrode 7 from the next electrode 9 which is also a fuel electrode. The space between electrodes 7 and 9 is a fueling chamber. Similarly, additional elements are placed in adjacent, abutting relationship to those discussed hereinbefore to form a continuing series of chambers: an air feed chamber, an electrolyte chamber, a fueling chamber, an electrolyte chamber, an air feed chamber, etc. Electrodes 5 and 7 are an air electrode and a fuel electrode, respectively. In effect, successive cells are alternately reversed so that one air chamber or one fuel chamber supplies two cells, except at the ends of the pack assembly.

The spacer elements 4, 6 and 8 are basically similar in construction; that is, they are gaskets or plates consisting of an open peripheral frame. This forms a chamber when electrode plates are brought in adjacent relationship to both sides of the frame. These frame-like spacer elements are constructed of nonconductive material, such as a suitable plastic or hard rubber. As shown by frame 10, each frame will contain notches at suitable points similar to notch 11. These form passageways to the interior portion of the frames when an electrode plate is placed adjacent the spacer member. These passageways 11 permit the introduction and removal, at appropriate points, of fuel, air, electrolyte and carbon dioxide to or from the respective chambers as appropriate. The position of the notch in the various frames will be dependent upon whether that frame is employed to form a fuel electrode chamber, an air electrode chamber or an electrolyte chamber. This will be more apparent from the discussion hereinafter.

It is to be understood that an individual fuel cell comprises a fueling chamber and an air or oxygen feed chamber with their associated electrodes (fuel electrode and air electrode, respectively), said electrodes being separated by an electrolyte chamber. Thus the fuel cell pack 1 contains a multiplicity of indivdual fuel cells, which are electrically connected as discussed hereinafter.

In the fuel cell pack illustrated, air, fuel and electrolyte are supplied to the individual fuel cells in the fuel cell pack from a longitudinally extending manifold structure 12 positioned below the fuel cell pack. The manifold 12 has passageways 13 and 14 therein which extend the length of fuel cell pack 1. These passageways are employed to supply air to the air electrode chambers of the individual fuel cells. The air passes through passageways 13 and 14 in manifold 12, through passageways in the floor 3 of the fuel cell pack (which will be discussed in more detail hereinafter), through the appropriate notches in the appropriate frame-like members aligned with the passageways in the floor 3 and into the air electrode chamber. Another passageway 15 in manifold 12 supplies fuel to the fuel electrode chambers in the fuel cell pack. The principle of supplying the fuel to the fuel electrode chambers is identical to that of supplying air to the air electrode chambers. If desired the manifold may serve as the flooring or bottom member of the fuel pack, i.e., a separate floor member 3 may be omitted. This is because the notches in the frame-like members are positioned so that they form passages which only communicate with the appropriate passageway or channel in manifold 12. For example, the notches in the frames which form fuel electrode chambers will be aligned in such a manner that they communicate only with passageway 15 in manifold 12. Similarly the passageways in the frames which form the air electrode chambers and the electrolyte chamber are located so as to only communicate with the air passageways 13 and 14. The electrolyte is supplied through another passageway 16 having an inlet 16a. Inlet 16a provides for the introduction or removal of electrolyte from the various electrolyte chambers in the fuel cell pack. This will be discussed in more detail in regard to FIGURES 2–4. Electrolyte is supplied through appropriate slots in spacers such as 6, which connect passageway 16 with each electrolyte chamber.

Referring now to the upper portion of FIGURE 1, there is shown another manifold 17 having a lower or base wall member 18. Base member 18 provides a top enclosure for the fuel cell pack, but for the same reasons discussed hereinabove with regard to member 3 it may be omitted. Manifold 17 has passageways 19, 20, 21 and 24. Passageway 19 is for the removal of fuel from the fuel electrode chambers while passageways 20 and 21 are for the removal of air from the air electrode chambers in the fuel cell pack. The air and fuel enter passageways 19, 20 and 21 by passing through notches or passageways in the frames which form the air and fuel electrode chambers, respectively. Passageway or notch 11 is illustrative of those formed by the cooperation of the frames and the electrode plates. Base member 18 will have perforations or slots which are in alignment with the passageways in the frames and one such slot is illustrated at 22. This slot is for air exiting from the air electrode chamber beneath it. In this manner, air and fuel flow through their respective chambers and exit into their respective passageways in manifold 17 where they are removed as a single stream shown in FIGURE 1.

It has been found during the operation of a fuel cell of this type that carbon dioxide is formed in the electrolyte chamber when a carbonaceous fuel is employed. The carbon dioxide evolves and passes upwardly through the electrolyte. In FIGURE 1 where electrolyte chambers are narrow, the carbon dioxide, which may push electrolyte ahead of it or carry entrained electrolyte therewith, would exit from the electrolyte chamber, via notches in the frames comprising the chamber, and pass through perforations, such as slot 23, in base member 18 into chamber or passageway 24 in manifold 17. Excessive entrainment causes flooding in passageway 24 with resultant shorting out of the individual fuel cells in the fuel cell pack. Such entrainment also can result in objectionable losses of electrolyte.

In the instant embodiment passageway 24 is provided with a baffle system comprising substantially vertical transverse wall-like partition members 25, which extend from one side wall of chamber 24 to the other side wall thereof and are attached thereto. These form liquid tight partitions in the lower part of passageway 24. Located between the various transverse elements 25 and the walls of passageway 24 are a first set of baffles in the form of a series of anti-slosh valves 26. Each of these comprises a plate 26a having a relatively small perforation 26b, said plate being supported on legs 26c which rest on base member 18. Each plate 26a has somewhat less area than the compartment where it is situated so that fluid can flow around its edges. As will be seen these valves are free to float or move about somewhat within this limited space. Another baffle is a substantially horizontal transversely slotted member 28 which extends the length of chamber or passageway 24 and is located above the anti-slosh valves 26. Member 28 is supported by elements 25 below the top and attached to the walls of passageway 24. The slots or perforations are shown at 29.

In operation, the carbon dioxide leaving the electrolyte chamber with entrained electrolyte passes upwardly through base member 18 into passageway 24. During its ascent it contacts the first baffle member or plate 26a whereby the entrained electrolyte has a tendency to collect on the lower surface of plate 26a, while the carbon dioxide ascends through the small slot or perforation 26b. The carbon dioxide then passes upwardly through the perforations or slots 29 in the upper baffle member 28 whereby it is collected and withdrawn from channel 24. Member 28 provides additional means to remove any remaining entrained electrolyte in the carbon dioxide. If, however, the fuel cell is tilted member 26 performs its anti-slosh function. When tilted the electrolyte flows up through opening 23 in member 18 and the valve 26, being made of plastic or other light nonconductive material, floats thereby substantially blocking off outlet slots 29 and preventing electrolyte from overflowing into the adjacent fuel cell and causing short circuiting. As tilting will only be temporary, for example if the fuel cell pack was on a ship, the escape of carbon dioxide will only be diminished for a short period of time and will be resumed when the fuel cell is righted again. It will be noted that the small perforation 26b will be aligned with the opening 29 when the valve is "floating" to permit the escape of some carbon dioxide but only limited liquid during the tilt. This is to prevent the build-up of excessive gas pressure which otherwise could cause the rupture of the carbon electrodes.

In this manner, it will be noted that electrolyte is rather completely separated from the carbon dioxide and additionally that any electrolyte so collected outside the electrolyte chamber will not contact electrolyte from an adjacent chamber because of partition members 25. Any electrolyte which accumulates temporarily in the spaces between members 25 in passageway 24 flows back through slots 23 into the respective electrolyte chamber. Thus shorting of the fuel cell pack is substantially prevented. The entire manifold 17 and the members therein are preferably constructed of nonconductive plastic material to prevent shorting. Polypropylene resin of suitable type is illustrative of a suitable plastic material.

The fuel cells in the fuel cell pack illustrated are electrically connected in series to produce high voltage. This is effected by connecting air electrode (cathode) 5 of the front fuel cell to the external circuit. Ionic transfer is effected between air electrode 5 and fuel electrode (anode) 7 via an aqueous electrolyte. The potential produced at fuel electrode 7 from electrochemical reaction in the front cell is transmitted by a conductor to the air electrode 9a of the adjacent or second fuel cell. The fuel electrode 9 of the second cell is connected by a conductor with the air electrode 40 of the third cell, etc. In this way the full series voltage is obtained at the ends of the fuel cell pack (the conductor means are not shown). If desired, conductive partition members 73 shown in FIGURE 6, and discussed in more detail hereinafter, may be used in the instant fuel cell pack without altering the basic operation of the fuel cell pack. The individual cells may be connected in series or parallel as desired.

Figure 2:
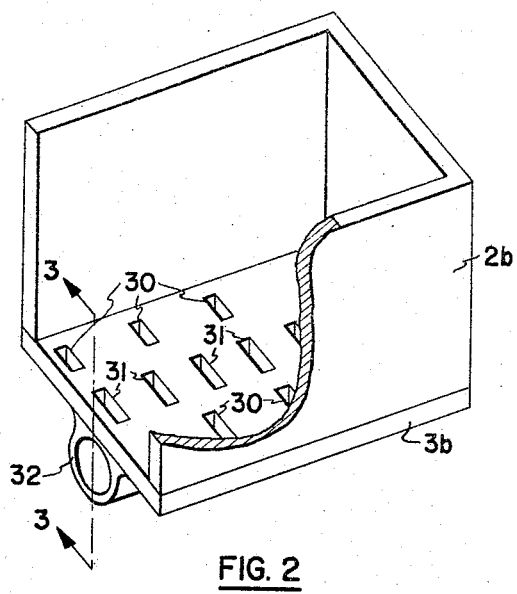
FIGURE 2 is a perspective view of a portion of a casing for the fuel cell pack showing the inlets for electrolyte and air or oxidizing agent.

Referring now to FIGURE 2, there is shown a perspective, partially cut away view of a casing similar to that of FIGURE 1 comprising wall members 2b and floor member 3b. In this figure some of the slots or passageways in the base member 3b are shown to illustrate the cooperation between the lower manifold and the frame-like fuel cell components discussed hereinbefore. For example, slots or perforations 30 are illustrative of air passageways in the base member 3b through which the air flows in traveling from the air feed manifold 13 to the air electrode chambers. Slots 31 illustrate similar passageways in a different portion of the base member 3b which are employed to distribute electrolyte to the electrolyte chambers. As will be seen later, these are also the passageways for removal of electrolyte. Member 32, which is part of the general manifold system 12 discussed in regard to FIGURE 1, is adapted to support a cylindrical drain valve shown in more detail in FIGURE 3.

Figure 3:
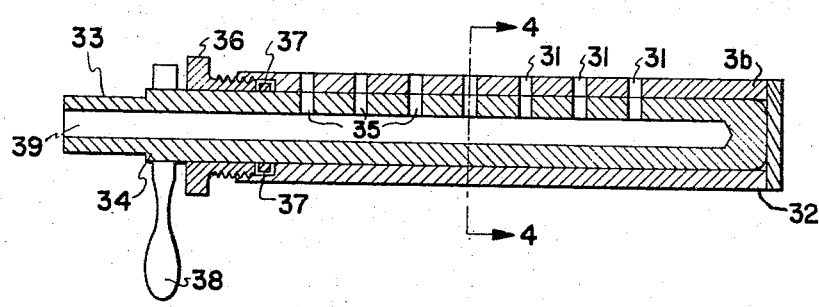
FIGURE 3 is a vertical cross-sectional view through FIGURE 2 taken approximately along line 3—3 with the drain valve in place.

Referring now to FIGURE 3, there is shown a drain valve 33 comprising a hollow, cylindrical member 34 containing radial slots or perforations 35 in its side. Slots 35 are aligned longitudinally with one another with slots 31 in base membar 3b. Hollow cylindrical member 34 is held in place by means of packing sleeve 36 which is in threaded relationship or any other suitable fastening means with members 3b and 32. Members 32 and 3b form a chamber of circular cross section into which hollow member 34 fits. A collar or projection 37 on the exterior surface of hollow member 34 prevents hollow member 34 from slipping out of the chamber formed by members 3b and 32. A handle 38 adapted to engage hollow member 34 provides means for turning hollow member 34 in its chamber so that slots 35 and 31 may be in or out of alignment as desired. The end 39 of hollow member 34 is adapted to engage suitable means for introducing or withdrawing electrolyte from the various electrolyte chambers in the fuel cell pack.

Figure 4:
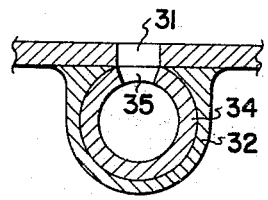
FIGURE 4 is a cross-sectional view of FIGURE 3 taken substantially along line 4—4.

Referring now to FIGURE 4, it may be seen that hollow cylindrical member 34 may be rotated so that the chamber therein is in communication with the slots 31 in base member 3b and thus with the electrolyte chambers in the fuel cells. Likewise, it is apparent that if member 34 is rotated sufficiently there will be no communication between slot 31 and the interior chamber of member 34. In this manner, one may rotate hollow member 34 to align slots 35 and 31 and thus, as desired, introduce or withdraw uniformly from the electrolyte chambers that amount of electrolyte desired. When the valve is rotated to cut off alignment of slots 35 and 31, each cell is again isolated from the other cells.

This apparatus therefore permits changing electrolyte if contamination should occur or for periodic maintenance. It also permits periodic leveling of the electrolyte in instances where entrainment, severe sloshing or tilting have made the electrolyte level in some cells higher than in others. By opening the valve slightly, self-leveling will be achieved with only a minor amount of short circuiting until the valve is closed again. The drain valve and its associated members are preferably constructed of nonconductive material, such as plastic or hard rubber. It may, of course, be insulated in other ways if preferred.

Although the foregoing recites the preferred method for admitting or withdrawing electrolyte, it is within the scope of this invention to position above the electrolyte compartments an electrolyte trough provided with small drain holes and adapted to meter proportional amounts of liquid into each such compartment.

Figure 5:
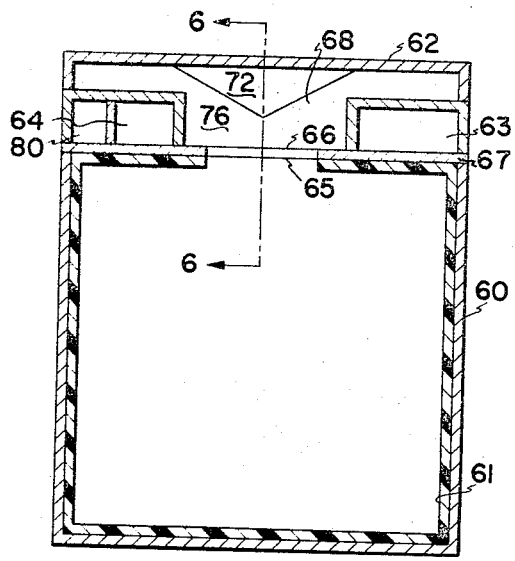
FIGURE 5 is a cross-sectional view of a modified embodiment of the instant invention showing means to prevent electrolyte from sloshing over into adjacent electrolyte chambers when the fuel cell pack is tilted, e.g. when mounted in a mobile support or carrier.

Referring now to FIGURE 5, there is shown a cross sectional front view of a fuel cell pack containing electrolyte tilt reservoirs. In the instant figure element 60 represents the cell pack housing and element 61 a peripheral frame-like spacer member forming the electrolyte chamber when a fuel electrode is placed on one side of it and an air or oxygen electrode on the other. The cell covering unit or manifold 62 contains passageways 63 and 64 which extend the length of the fuel cell pack and are for the collection of air as it exits from the air electrode chambers in the fuel cell pack. A passageway 80 in manifold 62, which likewise extends the length of the fuel cell pack, collects the surplus or unburned fuel as it exits from the fuel electrode chambers. The lower feed manifold has not been shown, but would be similar to manifold 12 discussed in connection with FIGURE 1. Frame or spacer 61 is notched at 65 to form a passageway communicating with perforation or slot 66 in base member 67 of the manifold 62. In this manner, the carbon dioxide formed in the electrolyte chamber can pass through 65 and 66 into manifold 62. An electrolyte tilt reservoir 76 above each of the unit cell electrolyte chambers is formed by vertical transverse partition walls 68 which are formed of nonconductive material and extend across the T-shaped passageway formed by manifold 62 and the longitudinal walls forming channels 64 and 80 and 63.

Figure 6:
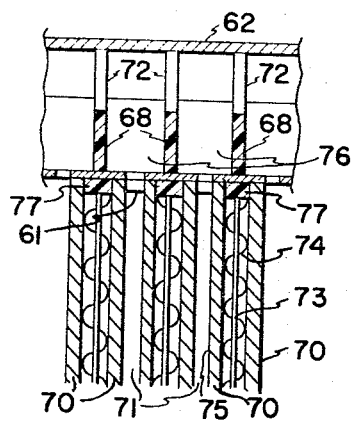
FIGURE 6 is a partial cross-sectional view of FIGURE 5 taken along line 6—6.

Transverse partitions 68 are seen in FIGURE 6. They each have a notch 72, see also FIGURE 5, therein which gives overhead communication with adjacent reservoirs whereby all the carbon dioxide from the plurality of electrolyte chambers may be withdrawn as one stream. Accumulations of electrolyte above one or more unit cells does not short the current.

In FIGURE 6, there is shown the relationship of the electrode plates to form electrolyte chambers 71. It will be seen that as the carbon dioxide ascends upwardly, carrying with it entrained electrolyte, that members 68 prevent the electrolyte from flooding over into adjacent electrolyte chambers. The same effect is achieved if the fuel cell pack be tilted and causes electrolyte to spill immediately into the electrolyte tilt reservoir 76, which might occur in a land vehicle or abroad a ship during heavy seas. Thus the member 68 restricts overflow from either cause.

There is also shown in FIGURE 6 an alternate method for conducting current in the cell pack. A partition member 73, consisting of a continuous sheet of electrical conductive material is drawn into a waffle-like pattern having protuberances 74 and 75 on its respective faces. This separates carbon electrodes 70 but is in contact with both and conducts electric current between them. The partition member 73 may be in a frame-like spacer member 77 which is similar to those discussed hereinbefore. The protuberances contact the adjacent electrode plates so that any voltage potential on these electrodes will be equalized and become identical with that of the partition member.

It will be understood that partition member 73 is a fluid tight partition, so formed that an oxidizer, e.g. air, can pass freely in contact with an electrode on one side of the partition member, while fuel, liquid or gaseous, can pass freely in contact with the fuel electrode on its other side. While this type of construction, the fuel cell pack is inherently connected in series without internal wiring. The electrode potential output of each fuel cell pack will be added in series so the total voltage of the fuel cell pack will be essentially equal to the voltage of one fuel cell times the number of fuel cells in the pack.

Figure 7:
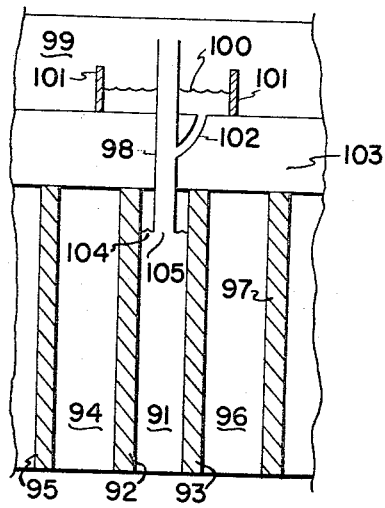
FIGURE 7 represents a cross-sectional view of another embodiment wherein the apparatus effects a separation of the electrolyte and carbon dioxide exiting from the electrolyte chamber and returns the electrolyte to the electrolyte chamber during the operation of the fuel cell.

Referring now to FIGURE 7, there is illustrated a schematic sectional view of a portion of a fuel cell pack pack with apparatus for separating the evolved $CO_2$ from the electrolyte and returning the electrolyte to the electrolyte chamber while simultaneously preventing electrolyte from overflowing into adjacent electrolyte chambers. The electrolyte chamber 91 is enclosed at its edges by the pack casing or housing and on its sides by electrode plates 92 and 93. To the left of the electrolyte chamber 91 is an air or oxidant chamber 94. Air chamber 94 is enclosed by electrode plates 92 and 95 and the aforesaid housing. To the right of the electrolyte chamber 91 is a fuel chamber 96 enclosed by electrode plates 93 and 97 and the aforesaid housing. Fuel preferably will constantly be circulating through chamber 96 and air through chamber 94 during operation of the cell pack. During the operation of the pack, carbon dioxide forms in the electrolyte of each unit fuel cell. Pressure created by the evolution of carbon dioxide will force the carbon dioxide and electrolyte through pipe 98.

As shown in FIGURE 7, pipe 98 is the means by which the electrolyte chamber 91 communicates with passageway or chamber 99 located above the fuel cell pack. Pipe 98 may be made of ordinary steel pipe, copper or plastic tubing depending upon the electrolyte employed. Chamber 99 is a suitable passage or chamber in a manifold structure, whereby gas evolving from the electrolyte chambers may be withdrawn as it enters from pipe 98.

As carbon dioxide and electrolyte ascend through pipe 98, the electrolyte overflows the wall of pipe 98 and descends into reservoir 100. Reservoir 100 is formed by the side walls of passageway 99 and suitable transverse partitions or barriers 101 which extend across the passageway 99. The electrolyte overflowing pipe 98 into reservoir 100 then runs back into the electrolyte chamber 91 via pipe 102 and down the inner walls of pipe 98. Pipe 102, therefore, connects the bottom of reservoir 100 with the pipe 98. If desired, pipe 102 may go separately back to the electrolyte chamber 91. This affords continuous return of the electrolyte, which may ascend by entrapment or pulsating pressure into reservoir 100.

This arrangement also provides for automatic control of electrolyte liquid level in each cell. It is apparent that the $CO_2$ evolved in each electrolyte chamber cannot leave the chamber until the liquid level 104 is depressed to the level corresponding to the lower end 105 of the pipe 98. Hence, this liquid level 104 is maintained during operation of the fuel cell, with excess electrolyte being retained in reservoir 100. This constant, equal electrolyte level in each cell of a cell pack insures equal performance from each cell in the cell pack, and therefore constant, reproducible and reliable performance of the entire fuel cell pack.

It will be noted in FIGURE 7 that the passageway or duct work 99 which collects the evolved carbon dioxide may be located above another duct 103 which may be utilized to collect the used air or, alternatively, to recover unconsumed fuel employed in the cell units.

Referring now to FIGURE 8, there is shown diagrammatically a cross-section of a fuel cell pack having two valves to permit release of gas such as carbon dioxide without loss of liquid electrolyte in case of transverse tilting. As here shown, the cell structure comprises a casing 201 with risers 202 and 203, each of which contains a perforate top wall or closure element 205 and a floating valve 206 of the same general type as valve 26 in FIGURE 1. When the cell is tilted from its normal upright position, indicated by the dotted lines, to the full line position, the liquid level causes the valve at the right to close and prevent loss of liquid, carbon dioxide bubbles being allowed to escape at the left as indicated by the arrows.

Referring to FIGURE 9, there is shown a modification of valve closure means which is a variation of FIGURE 1. In other respects the apparatus is the same and comprises a cell pack casing 1 with the top ductwork manifold 17 and the transverse spacers 4 and 6 and plates 5 and 7 etc.

The slots 23 in the conduit through which carbon dioxide is intended to escape from all of the cells, are the same as in FIGURE 1, as are also transverse partition elements 25. In this case, however, longitudinal slots 210 are formed in the upper wall and the floating valve 26 has a plurality of openings 211, any one of which can permit the gas to escape. Upon tilting, the float 26 rises and closes the slots 210 except for the small openings 211 as in the case of openings 26b, FIGURE 1.

Flanged retaining members 212 and 213 run longitudinally above the slots 210 and enclose with a smooth sliding fit small closure plates 214. These are so arranged that they will slide by gravity to cover the lower end of slots 210 in case of tilting, but will leave the upper end open. By suitable sizing they may be arranged to move freely under influence of gravity in any direction to permit gas to escape at an upper corner or portion of either slot, but they close the other slot or portions of both slots so as to effectively prevent loss of electrolyte liquid outside the cell. Protuberances or bosses 215 are pressed in the upper wall 216 to limit the sliding of these closures.

Referring now to FIGURE 10, the structure shown is essentially the same as that of FIGURE 5 and similar reference characters are used, except that the transverse members 168 corresponding to members 68 of FIGURE 5, have a notch 172 in each upper corner. The conduits 163, 164 and 180 are arranged in the middle but otherwise correspond to conduits 63, 64 and 80 of FIGURE 5. Electrolyte can emerge through openings 165 on either side. This arrangement permits for ready escape of carbon dioxide gas without substantial loss of liquid in case of tilting in either direction.

The number of unit cells in the packs discussed herein may be increased as desired with appropriate connections to build up voltage or current to a desired level. The fuel cell packs may be connected in series and/or parallel if desired, so as to multiply the total output current as well as the voltage to any extent desired.

The active components of the cells are well known and need not be described in detail. Suitable catalysts, electrolytes, oxidants and fuels are well known. This invention provides novel apparatus for more efficient utilization of the fuel cell principle and is not limited to the use of any particular catalyst, electrolyte, etc. The over-all fuel cell reaction is the sum of two essentially independent half-cell reactions. Hence, any suitable catalytic material which will promote its appropriate half-cell reaction may be used. Naturally, the acidity or basicity of the electrolyte to be used will be considered in choosing the catalysts as well as components and materials of construction. Within these limits any suitable fuel cell catalysts formed in or on the the electrode elements may be used.

It will be understood also that the term "fuel electrode" as used herein is equivalent to "anode" and that "oxygen electrode" or "oxidizing electrode," etc. is equivalent to "cathode."

Other modifications consistent with the spirit of the invention will suggest themselves to those skilled in the art and it is intended to cover them, so far as the prior art permits, by the following claims.

What is claimed is:

1. In combination with a fuel cell pack containing a plurality of electrolyte chambers, manifold means located above said electrolyte chambers, said manifold means including a continuous passageway; a fluid outlet in each of said electrolyte chambers communicating with said passageway; a plurality of partition members within said passageway and extending transversely therein, at least one of said partition members being located between adjacent fluid outlets of said electrolyte chambers; a cover member located in and extending the length of said passageway, said cover member being supported by said partition members and having at least one port in normal flow communication with each electrolyte chamber; and at least one floating perforated plate-like valve member located within said passageway below said cover member and above said fluid outlets.

2. The combination defined by claim 1 wherein said cover member is normally substantially horizontal.

3. The combination defined by claim 1 wherein said perforation in said plate-like valve member is adapted to permit limited fluid when said valve member is in closed position.

4. The combination as defined by claim 1 wherein said perforation in said plate-like member is in alignment with a port in said cover member when said valve member is in closed position.

5. A combination as defined by claim 1 containing slide valve means adapted to close the ports in said cover member by gravity when the cell pack is tilted from a normal horizontal position.

References Cited

UNITED STATES PATENTS

| | | | |
|---|---|---|---|
| 699,621 | 5/1902 | Humphreys | 137—266 X |
| 1,107,084 | 8/1914 | Mason | 136—177.3 |
| 1,216,786 | 2/1917 | Eaken | 136—162 |
| 2,185,099 | 12/1939 | Woodbridge | 137—43 |
| 2,925,455 | 2/1960 | Eidensohn | 136—86 |
| 3,012,086 | 12/1961 | Vahldieck | 136—86 |

FOREIGN PATENTS 1,250,769  12/1960  France.

WINSTON A. DOUGLAS, *Primary Examiner.*

JOHN R. SPECK, JOHN H. MACK, A. B. CURTIS, H. FEELEY, *Examiners.*